FEEDER FOR MOISTURE ABSORBING CHEMICAL
Filed May 17, 1962
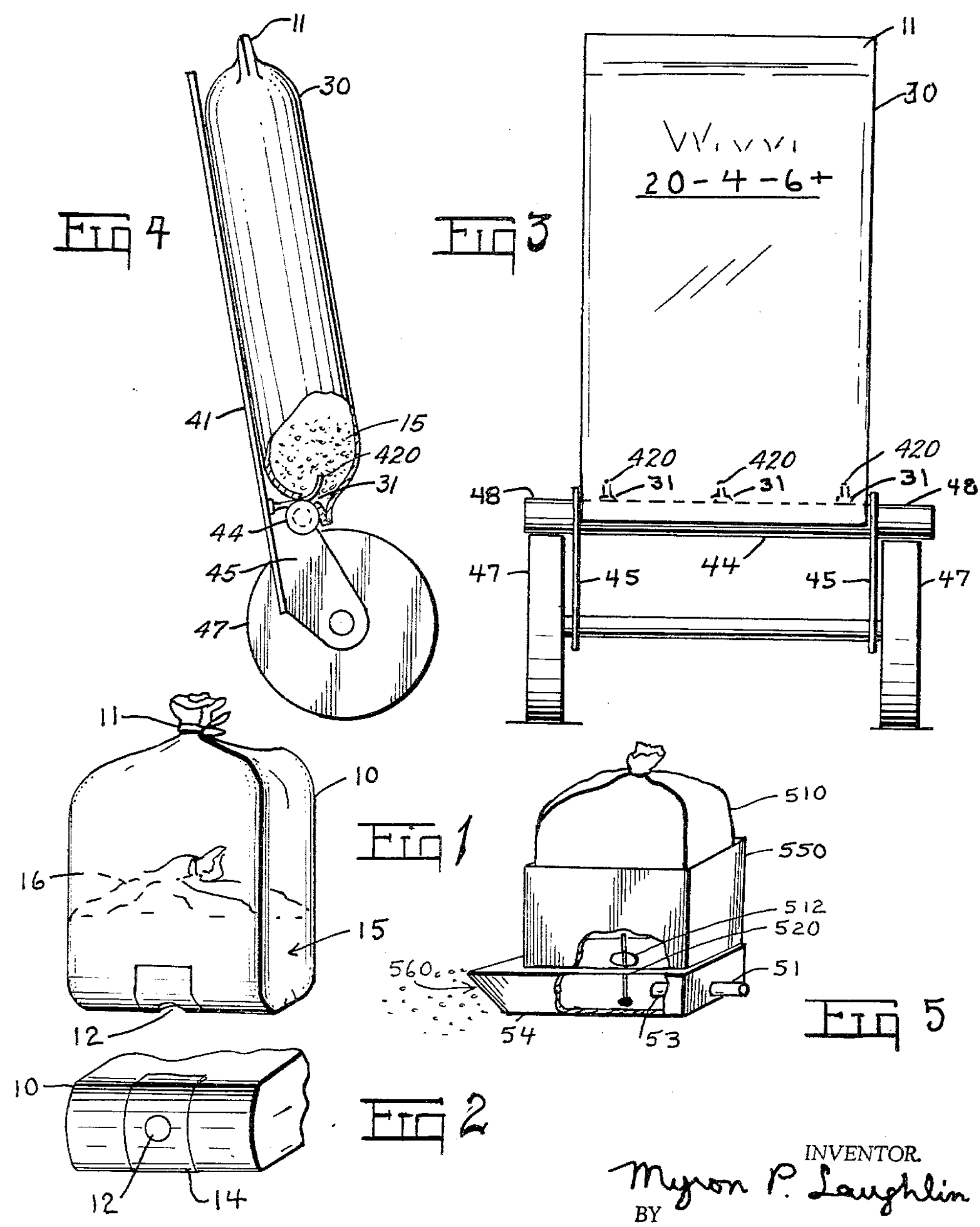
INVENTOR.
Myron P. Laughlin
BY

United States Patent Office 3,216,620

Patented Nov. 9, 1965

3,216,620

FEEDER FOR MOISTURE ABSORBING CHEMICAL

Myron P. Laughlin, 470 3rd St. S. (Carlton Tower) St. Petersburg, Fla.

Filed May 17, 1962, Ser. No. 196,040

2 Claims. (Cl. 222—83)

This invention relates to the storage and feeding of hydroscopic chemicals and more particularly to feeding water absorbent fertilizer chemicals at the point of application.

Heretofore there has been considerable difficulty in supplying fertilizers to the public in satisfactory condition. Particularly this was true of the highly concentrated type fertilizer because of the affinity which the chemicals have for oxygen and moisture. Such extraneous chemicals and moisture not only reduce the potency of the fertilizer, but change its mechanical form adding corrosive and caking difficulties which prevent satisfactory application through spreading devices. The similar problems have been present with liquid fertilizers in that when exposed to the air they undergo potency changes and become less suitable for the purposes for which they were intended; often increasing in bulk to such extent that the rate of application is no longer correct for soil needs.

It is the primary purpose of this invention to provide packages for fertilizer which will, in themselves, provide automatic rate of application meters while at the same time preventing contamination of such chemicals so that they are delivered by the metering devices to the area to be fertilized in the same condition they were made by the manufacturer and at the rate and potency originally designed; this with simple devices within feasible cost range so as to present no added packing, shipping or sales difficulties.

This application is an extension and improvement over my application Ser. No. 810,947 which matured to Patent No. 3,043,482 and will disclose certain improvements in feeder packages adapted to cooperate with the feeder mechanisms of this earlier application, and with certain other feeder mechanisms, as will develop as this invention is described.

Special purposes and improvements over former methods of packaging moisture absorbent chemicals, such as obvious prevention of loss by oxidation and exposure to the air, will appear as the appended description of the drawings proceeds.

In the drawings:

FIG. 1 is an elevation of one form of improved fertilizer package.

FIG. 2 is a bottom view of the package shown in FIG. 1.

FIG. 3 is an elevation of one type of feeder with the chemical package thereon for dispensing purposes.

FIG. 4 is a side view taken in section of the device of FIG. 3 with certain parts broken away to aid description.

FIG. 5 is an elevation of a different type of feeder with a modification of the improved fertilizer package in use thereon and with certain parts broken away to aid description.

Referring now to FIG. 1, 10 indicates a bag of flexible water tight material, such as plastic film, having a filling opening 11 at its top and a discharge metering opening 12 at its bottom. Opening 11 is preferably sealed after the chemical has been placed in the bag and metering opening 12 may take the form of a die cut orifice stiffened by a reinforcement 14 affixed to the bag. When distributed the sack 10 has its metering opening 12 closed by a suitable sealing patch which is removed only when the chemical is to be dispensed from the bag. It will be seen that a chemical 15 placed in the bag is sealed from the atmosphere by seal 11 and that removal of chemical through discharge opening 12 will not admit air to the chemical since this opening is well below the surface of the chemical at all times. The flexible walls of the sack 10 collapse, as at 16, under atmospheric pressure and close in upon the surface of the chemical as its bulk decreases so that the chemical remains fully sealed from the atmosphere until fully dispensed. The collapsible sack may have multiple discharge openings and be used within an outer sack 30 or a canister 550 to protect it from mechanical abrasion. It will be understood that in the event such outer protector is used, the outside container need not collapse with the sealing bag nor need it be opened to the air if discharge openings are provided therein registering with discharge opening 12 since the seal may be removed by a suitable lance 420 which may form part of the feeding mechanism as shown in FIGS. 3, 4 and 5.

Referring to FIG. 3 in particular and supplementing its description by reference to FIG. 4: A sack 30 is packed with a required amount of chemical and sealed at 11. The discharge openings 31 are covered with a seal tape removable when the sack is placed on the feeder device which has a support 41, mounting a series of lance hooks 420 which ride upon the roller 44 journaled in bearings 45, secured to the backboard 41 and mounted on a suitable ground carriage which may include ground wheels 47. Roller 44 may be extended as at 48 to ride upon the ground wheels 47 and to be revolved by them, while at the same time it covers the discharge openings 31 in sack 30 so that as the roller revolves (as the ground carriage is pushed over the surface to which fertilizer is to be applied) it will wipe and roll the fertilizer through the metering orifices 31 in the sack and accomplish feeding proportionate to the ground speed and to the area to be fertilized, orifices 31 are substantially similar in feeding action to orifice 12 of FIGS. 1 and 2. It will also be clear that stopping carriage motion and ground wheels 47 will cut off fertilizer flow and leave the chemicals fully sealed within the sack until the next application. The importance of such simple means to provide proportionate feeding and automatic sealed cut-off when the feeding device is stopped offers practical solutions for problems which have long troubled the garden supply industry and which have previously necessitated complicated and expensive mechanism with only partial performance. The present device provides such facilities in such low cost form that the manufacturer of garden chemicals can now afford to protect his product from his factory to the point of application and assure its proper application without added expense to the user. Since lance rods 420 ride upon the surface of roll 44, it will be understood that they are vibrated by the roll motion and serve to agitate and assist the flow of the fertilizer from the sack through the metering openings without added mechanism.

FIG. 5 serves to show a jet form of feeder wherein fluid under pressure (such as exhaust gas from the lawnmower engine) is admitted through a pipe 51 to a jet 53 in discharge casing 54. Rod 520 here is preferably mounted in the bottom of the casing and projects upward into the sack discharge port 512 which extends into the sack 510 fitting into container 550. In this case, rod 520 is vibrated by the exhaust impulses and assists in feeding the fertilizer chemicals as previously described. The chemicals may be discharged over a considerable area since they emerge at 560 at substantial velocity.

The forms of feeder which have been described act in similar fashion to those shown in my earlier applications and it will be understood that many other forms of granular feeder may be employed in connection with my invention and with the successful distribution of chemicals in their original first packed form, well within the knowledge of those skilled in the art and within the scope and spirit of the appended claims.

I claim:

1. A dispenser for hygroscopic water absorbing dry fertilizer chemicals comprising
   (a) a collapsible water-tight sack for said chemicals,
   (b) a discharge meter orifice in said sack wall,
   (c) a puncturable seal for said orifice,
   (d) and means for discharging said chemicals from said sack including a puncture element for piercing said seal and a valve member, the whole providing means whereby a body of dry chemical placed within the sack may be stored and discharged in whole or in part without admitting moisture to the chemical retained in the sack.

2. In a dry fertilizer distributing device, a sealable airtight container provided with a filling opening and a sealed metering discharge port, a transport vehicle for said container, and supporting valve means including a lance piercing and entering said discharge port and responsive to the motion of said vehicle to permit discharge from said container only when said vehicle moves.

References Cited by the Examiner

UNITED STATES PATENTS

| | | | |
|---|---|---|---|
| 2,111,875 | 3/38 | Swanson | 222—231 |
| 2,147,349 | 2/39 | Piquerez | 222—107 |
| 2,187,376 | 1/40 | Guibert | 222—193 |
| 2,389,747 | 11/45 | Stone et al. | 222—107 |
| 2,728,492 | 12/55 | Fox | 222—177 |
| 2,745,754 | 5/56 | Steinbock | 99—179 |
| 2,865,536 | 12/58 | Price | 222—177 |
| 2,905,560 | 9/59 | Bender et al. | 222—183 X |
| 2,986,142 | 5/61 | Bieberdorf et al. | 222—81 |
| 3,070,263 | 12/62 | McCullen | 222—177 |
| 3,080,098 | 3/63 | Fierman | 222—177 |

M. HENSON WOOD, Jr., *Primary Examiner.*

LAVERNE D. GEIGER, LOUIS J. DEMBO, *Examiners.*